May 31, 1949.  W. P. COUSINO  2,471,813
INJECTION MOLDING APPARATUS
Filed Sept. 28, 1944  2 Sheets-Sheet 1

INVENTOR.
Walter P. Cousino.
BY Barnes & Harris
ATTORNEYS.

May 31, 1949.   W. P. COUSINO   2,471,813
INJECTION MOLDING APPARATUS
Filed Sept. 28, 1944   2 Sheets-Sheet 2

INVENTOR.
Walter P. Cousino.
BY
ATTORNEYS.

Patented May 31, 1949

2,471,813

UNITED STATES PATENT OFFICE 2,471,813

INJECTION MOLDING APPARATUS

Walter P. Cousino, Detroit, Mich., assignor to Chrysler Corporation, Highland Park, Mich., a corporation of Delaware Application September 28, 1944, Serial No. 556,119

2 Claims. (Cl. 18—30)

This invention relates to an improved injection molding apparatus and method and is an improvement over my applications Serial Nos. 471,693, now Patent No. 2,402,805, and 521,197, filed January 8, 1943, and February 5, 1944, respectively.

More particularly, the invention pertains to improvements in an apparatus of this kind by which can be discharged substantially continuously and under pressure for molding, extruding and other purposes, materials of a wide variety of compositions and physical properties, including compounds comprising natural rubber, synthetic rubber, ceramics, thermosetting and thermoplastic resins, metals and numerous other moldable and extrudable compounds.

One of the main objects of the invention is to provide in reversably driveable pressure-creating mechanism, of the type shown in my copending application Serial No. 521,197, having improved valve means for interrupting the flow of material from the nozzle of such apparatus at the end of a discharge operation.

Another object of the invention is to provide a shiftable screw member in the pressure-creating unit of apparatus of this kind which has an end portion fashioned to serve as a valve for obstructing unintended flow of material from the nozzle of the apparatus as well as back-flow of material from a mold with which the latter is associated in operation.

A further object of the invention is to provide resilient means for yieldably urging the shiftable screw of apparatus of this character toward its valve closing position and which is adapted to accommodate shifting of said screw in a reverse, valve opening direction under the action of the pressure created thereby on the material being injected.

A still further object of the invention is the provision of a shiftable screw of this kind which is urged toward valve closing position when the drive of the screw is reversed in order to relieve the pressure on the contents of the apparatus following an injecting operation.

Another object of the invention is to provide means in injecting apparatus of this character for working all portions of the material immediately before it is discharged therefrom and which assures uniform heating of such material immediately prior to its discharge when heating of the material at this stage is desired.

An additional object of the invention is to provide a stem-like projection on the end of the screw of a plastic injecting device of this character which extends into the discharge passage of its nozzle in slightly spaced relation to the walls thereof and which is rotated with the screw to work and churn the material as it passes through the discharge passage while also retaining a relatively thin wall cylinder of the material of substantially uniform thickness in intimate heat-receiving relationship with respect to such passage wall.

Another object of the invention is to provide a thread on the above mentioned stem-like projection which serves to increase the working action upon the material being discharged and which also serves to force out of the nozzle passage any of the material that becomes unintentionally set or hardened, as for example upon starting of the apparatus following shut down or after an excessively long delay between successive injecting operations.

A further object of the invention is to provide in apparatus of this character resilient means for maintaining the valve portion of the end of the shiftable screw thereof in closed position in order to obstruct the flow of material to the nozzle discharge passage until the material is subjected to a predetermined pressure of sufficient magnitude to effectively work and frictionally heat the material as it flows between the stem-like projection and the wall of the nozzle passage.

An illustrative embodiment of the invention is shown in the accompanying drawings, in which Fig. 1 is a fragmentary side elevational view of injecting apparatus embodying the invention.

Fig. 3 is a transverse sectional view taken on line 3—3 of Fig. 2.

Figure 1:
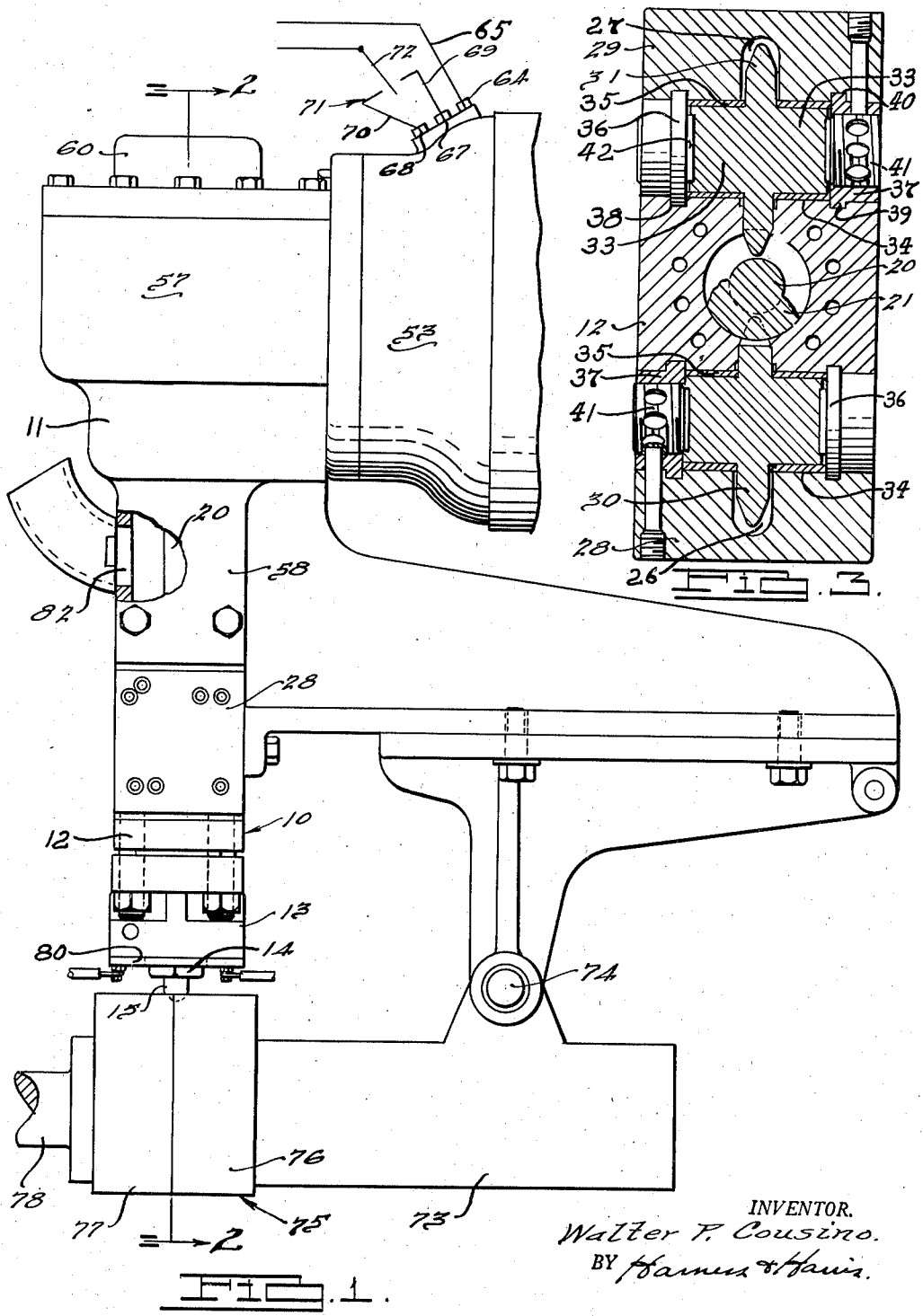

While the injecting apparatus is shown in the drawings associated with mold structure, it can be readily applied to an extruding die. The injecting apparatus, best shown in Fig. 2, comprises a tubular body portion, generally designated by the numeral 10, having an upper section 11, an intermediate section 12, and a heating chamber 13 to which is attached a nozzle body 14 having a discharge nozzle element 15 located at its extreme end.

The intermediate section 12 is provided with a bore 16 which is axially aligned with the passage 17 in the heating chamber as well as with the discharge passage 18 of the nozzle. A conveyor-like screw 20 extends through the bore 16 and is provided with a thread 21 which relatively closely fits the wall of the bore 16 and which extends through the interior of the upper section 11 to a location adjacent the nozzle body 14. The screw 20 is rotatably and axially shiftably supported by means, hereinafter more fully described, located within the upper section 11 of the tubular body portion 10. Provided on respectively opposite sides of the bore 16 are chambers 22 and 23 which are formed in part by slots 24 and 25, respectively provided through the wall structure of the intermediate section 12, and in part by recesses 26 and 27 of caps 28 and 29, respectively, which are mounted on the sides of the intermediate section 12 in alignment with the slots 24 and 25 thereof.

Rotatably mounted in each chamber 22 and 23 is a gear-like element 30 and 31, respectively, having teeth meshed with the thread 21 of the screw 20 in a worm and gear relationship. Each of the gears 30 and 31 have bosses 33 extending from their opposite sides which are journalled in apertures 34 formed partially in the wall structure of the intermediate section 12 and partly in the caps 28 and 29. The bosses 33 are rotatably received within bearing elements 35 disposed in the apertures 34 which are held against axial displacement from the apertures 34 by plugs 36 and 37. The plug 36 comprises a metal disc having its peripheral portion seated in a groove 38 formed in the wall structure of the intermediate section 12 and associated cap. The plug 37 comprises a metal sleeve having a radially extending flange 39 seated in a groove 40 similar to the groove 38. The plug 37 is provided with a central threaded aperture in which a threaded plug 41 is disposed. The plug 41 engages the extremity of one boss 33 of each gear and serves to hold the opposite extremity of the other boss 33 thereof against an abutment 42 provided on the inner side of the plug 36.

The gears 30 and 31 serve as rotatable dams and the teeth thereof extend into the groove of the thread 21 of the screw 20 to positively oppose turning of material operated upon by the thread of the screw with the latter. In this manner, a pressure is positively built up upon the material within the bore 16 of the intermediate section 12, as well as upon the material contained in the passage 17 of the heating member 13. The teeth of the gears 30 and 31 are meshed with the thread 21 of the screw 20 at a location spaced from the inlet end 43 of the intermediate section 12. There is at least one complete full turn of the thread of the screw 20 which is in close fitting relationship with respect to the wall of the bore 16 between the inlet end of the bore 16 and the location at which the slots 24 and 25 communicate therewith. With this construction any material operated upon by the screw which is displaced from the bore 16, by reason of its being carried between the teeth of the gears 30 and 31, is returned to the bore at a location at which the material is at least initially compressed by the thread of the screw. Therefore, the moldable material which thus flows through the chambers 22 and 23 is not removed from a zone of high pressure to a zone of atmospheric pressure and accordingly compressive work which has been done on this material is not lost.

The screw 20 has a shank 44 on its upper extremity of substantially square cross section which is shiftably received in a corresponding shaped socket 45 of a spindle 46. A pin 47 extends through openings in the wall of the socket 45 and a registering oversize slot 48 in the shank 44 for holding the screw against displacement from the spindle and limiting its axial shifting movement in respectively opposite directions. The lower end of the screw 20 is provided with a tapered extremity 48 which is adapted to serve as a valve element and to cooperate with a correspondingly tapered valve seat provided by the wall of a cavity 50 formed in the inner end portion of the nozzle body 14 at a location immediately in advance of the discharge passage 18 of the nozzle. The lower extremity of screw 20 is bored and threaded for receiving a stem 51 which extends into the discharge passage 18 of the nozzle. The stem 51 is somewhat smaller in cross section than the passage 18 and it is provided with a thread 52 which preferably has a pitch in the same direction as that of the thread 21 of the screw 20. A spring 53 disposed in the socket 45 of the spindle 46 normally yieldably urges the screw 20 downwardly, as viewed in Fig. 2, in order to retain the valve element 48 on its seat 49 and to thus close the inlet end of the nozzle discharge passage 18 while the screw is either at rest or so operating upon material in the passages 16 and 17 as to subject it to compression less than a predetermined value. When the compression to which the material is subjected exceeds this value, the back pressure upon the thread of the screw 20 shifts the latter against the action of the spring, thereby removing the valve element 48 from its seat 49 and accommodating the flow of the material through the discharge passage 18 of the nozzle.

Figure 2:
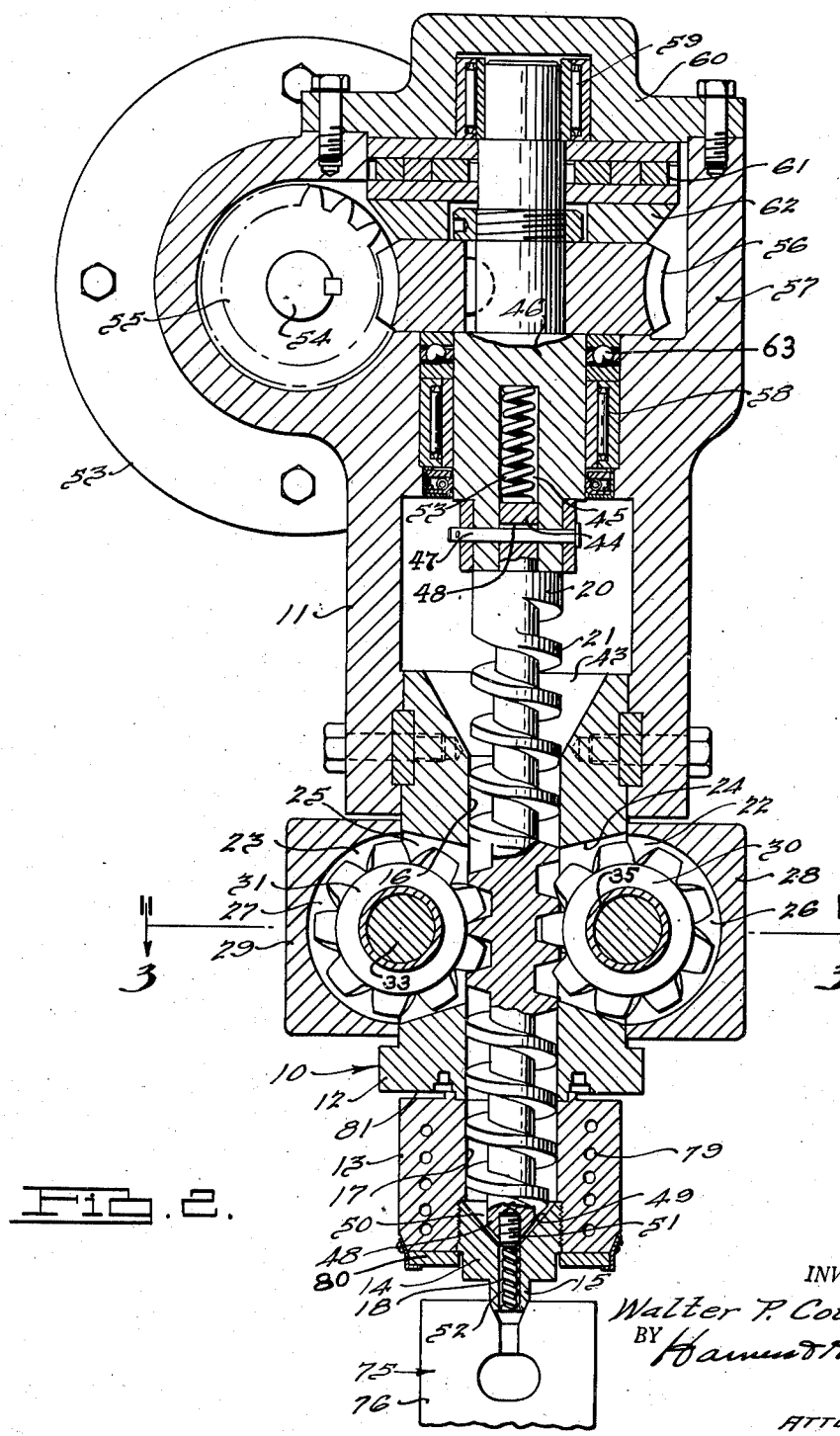
Fig. 2 is a vertical sectional view taken on line 2—2 of Fig. 1.

The screw 20 may be driven and controlled by the driving and automatic control apparatus disclosed in my copending application, Serial No. 521,197, but for the purpose of illustration, a simplified driving and manual control system is illustrated in Figs. 1 and 2. This apparatus includes a motor 53 having a shaft 54 provided with a worm 55 which is meshed with a worm gear 56 keyed to the spindle 46. The motor 53 is supported by and the transmission gearing is disposed within a housing 57 spaced vertically from the intermediate section 12 of the injecting apparatus by the tubular structure, heretofore referred to as the upper section 11 of the injecting apparatus, which is preferably formed integral with the transmission housing. The spindle is rotatably supported by spaced rolling contact bearing units 58 and 59 mounted in the housing 57 and cover plate 60 of the latter, respectively. A thrust bearing unit 61 disposed between the cover plate and a spacer 62 which bears upon one side of the worm gear 56, opposes axial movement of the latter in one direction and a thrust bearing unit 63 disposed between the bearing unit 58 and the other side of the gear opposes axial movement of the worm gear in the opposite direction.

The motor 53 is of a reversible driving type and is provided with a terminal 64 which is connected by a conductor 65 directly with one conductor of a power line. Terminals 67 and 68 on the motor 53 are connected to fixed contacts 69 and 70 of a reversing switch 71 having a movable contact 72 connected to the other conductor of the power line. The motor or any other driving means for the screw 20 may be selectively driven in forward and reverse directions in any suitable manner, the foregoing being a diagrammatic illustration of an operable control circuit. If desired, forward and reverse driving of the screw 20, as well as discontinuation of both driving actions, may be automatically effected with the control apparatus disclosed in my above mentioned application, Serial No. 521,197.

When the injecting apparatus is used in mold-filling operations it is preferably pivotally mounted on a support 73 for rocking movement about an axis 74 into and out of mold-filling relationship with respect to a die or mold generally designated by the numeral 75. For the purpose of illustration, the mold is shown in the drawings to include separable parts 76 and 77 mounted on the support 73 and on a shiftable ram 78, respectively.

The material to be injected may be heated while it is in the injecting apparatus in any suitable manner. A heating element 79 may be provided in the wall structure of the heating chamber 13 and the end of this chamber, as well as the nozzle, may be heated by a heating element 80 fixed to the lower end of the chamber 13 and surrounding the nozzle. A gap 81 may be provided between the main portions of the adjacent ends of the intermediate section 12 and heating chamber 13 in order to reduce the transmission of heat from the latter to the material in the vicinity in which it is being initially placed under compression.

In operation, the material to be injected is fed through an inlet opening 82 in the wall of the upper section 11 into the interior of the latter and through the inlet end 43 of the intermediate section into the passage 16. Such material may be supplied through the inlet 82 in comminuted, powdered, granular or other suitable form or by feeding mechanism (not shown) such as that illustrated in my copending application Serial No. 521,197. A continuous bar or ribbon of rubber-like material may be introduced through the inlet opening 82 and so engaged in the thread 21 of the screw as to progressively unwind it from a reel or other support and feed it through the inlet 43 by the action of the screw during its forward rotation.

As the screw 20 is driven in a forward direction, material introduced through the inlet opening 82 is conveyed by it downwardly through the passage 16 of the intermediate section 12. During initial forward rotation of the screw 20, the spring 53 holds the valve element 48 on its seat 49, thereby initially obstructing flow of the material to the nozzle passage 18. As the pressure to which the material is subjected is increased, it urges the screw 20 axially upwardly against the action of the spring 53 and moves the valve element 48 to its open position, illustrated in Fig. 2. This automatic valve action assures that the material will not be discharged from the apparatus until it is subjected to a predetermined pressure.

The gears 30 and 31, which mesh with the thread of the screw 20, serve, during forward rotation of the screw, to prevent the material between the turns of the thread from rotating with the screw, thereby assuring a positive creation of pressure upon the material. The forward rotation of the screw, which is initiated by manually moving the contact 72 of the switch 71 into engagement with the contact 59, is continued until the cavity of the mold 75 is filled. When this occurs, the back pressure exerted upon the nozzle by the material being discharged, tilts the injecting apparatus in a clockwise direction, as viewed in Fig. 1, about its pivotal axis 74, to bring the nozzle out of seated engagement with the inlet of the mold. When the machine is being manually operated by control of the switch 71, illustrated in Fig. 1, this tilting movement of the apparatus serves as a signal to the operator to move the contact 72 of the switch from engagement with the terminal 69 into engagement with the contact 70 in order to establish the reverse operation of the motor 53. Reverse driving by the motor 53 is continued only momentarily, preferably only sufficiently to rotate the screw 20 reversely through a fraction of one rotation. This reverse action may be continued through several rotations or until rotation of the screw 20 is sufficient to relieve the pressure within the passage 16 of the intermediate passage 12 and the passage 17 of the heating chamber 13 to an extent sufficient to permit the spring 53 to urge the screw 20 axially downwardly, thereby seating the valve element 48 upon the valve seat 49. The relief of the pressure which is brought about by reverse rotation of the screw 20, immediately upon cessation of the forward rotation of the screw, prevents the material which has been placed under compression from flowing throughout the chambers 26 and 27 in which the gears 30 and 31 are disposed and becoming so compacted therein as to prevent subsequent operation of the apparatus by interposing an excessively high starting torque resistance. Although the control switch illustrated is suitable only for manual control of the injecting apparatus, it should be understood that all of the automatic control mechanism illustrated in my copending application, Serial No. 521,197, may be employed in the operation of the foregoing injecting apparatus. It should also be understood that all of the advantages set forth in my above mentioned application of reversely rotating the screw immediately after cessation of its forward movement are obtained with the apparatus disclosed herein.

The threaded stem 51 which extends through the nozzle passage 18 serves the dual purpose of working the material as it is propelled under pressure through the nozzles and simultaneously spreading it upon the wall of the passage 18 in a thin layer of cylindrical formation. These two combined actions assure that all portions of the material which pass through the nozzle are brought into intimate and uniform heat-receiving relationship with respect to the walls of the nozzle passage. This avoids excessive heating of the exterior layer of a relatively thick body of material and insures heating of the interior thereof. During injection of certain materials, such as those having rubber-like properties, the working thereof and the action upon it of the thread of the stem, frictionally supplements the heat supplied thereto. When operating upon some material such as certain rubber-like compounds, the heat frictionally created in the nozzle passage can be relied upon as the sole source of heat applied to the material as it is forced into the mold. Inasmuch as the thread 52 of the stem 51 is formed in the same direction as the thread of the screw 20, any material contained in the nozzle passage which becomes set or hardened between injecting operations may be readily screwed out of the nozzle passage by operating the screw in a forward direction momentarily prior to arrangement of the apparatus and mold for filling the latter.

The valve action performed by the valve element 48 and seat 49, not only obstructs the unintended escapement of material from the apparatus, but it also prevents the back-flow of material under pressure of the material in the mold cavity during the period following filling of the mold and cessation of the forward drive of the screw 20. In this connection, it should be understood that the nozzle 15, though lifted from the mold after the cavity thereof is completely filled, still serves to retain the contents of the mold cavity under pressure in the same manner as accomplished by the apparatus disclosed in my copending application, Serial No. 521,197, wherein it is clearly set forth that the nozzle and the thin film of material which escapes between its tapered lowered extremity and the correspondingly shaped side wall of the mold inlet serve to effectively hold the contents of the mold cavity under compression until a solidified plug is formed in the mold inlet which then serves to retain the contents of the mold under compression to which it was previously subjected until completion of the solidification of the material takes place either by curing or cooling action, depending upon the nature of the material.

Although but one specific embodiment of the invention is herein shown and described, it will be understood that various changes in the sequence of operations, steps and materials employed may be made without departing from the spirit of the invention.

I claim:

1. Apparatus for injecting material under pressure comprising a housing having inlet and outlet openings, a valve seat in said housing adjacent said outlet opening, mechanism for displacing said material from said housing comprising a screw member rotatably and axially shiftably mounted in said housing and having a valve element thereon engageable in complete sealing relationship with said valve seat for completely closing said outlet opening, and means resiliently urging said screw member axially for sealingly engaging said valve element on said valve seat when said displacing mechanism is inoperative, said screw member being shiftable axially against the action of said resilient means by back pressure of said material thereon during operation of said mechanism for disengaging said valve element from said valve seat.

2. Apparatus for injecting material under pressure comprising a housing having inlet and outlet openings, a valve seat in said housing adjacent said outlet opening, a screw-type displacing member rotatably and axially shiftably mounted in said housing having a valve element thereon engageable with said valve seat in sealing relationship therewith for completely obstructing the flow of such material from said outlet, mechanism for selectively drivingly rotating said displacing member forwardly in a displacing direction and reversely, respectively, said valve element being urged toward said seat during reverse rotation of said displacing member by the reaction on the latter of the material in its thread, and resilient means cooperating with said valve-closing action applied on said displacing member during said reverse rotation thereof for urging said displacing member axially in a direction to engage said valve element on said valve seat, said displacing member being shiftable axially in an opposite direction against the action of said resilient means by pressure of said material thereon during forward driving thereof and being urged in said first mentioned direction by pressure of said material thereon during reverse drive operation.

WALTER P. COUSINO.

REFERENCES CITED

The following references are of record in the file of this patent:

UNITED STATES PATENTS

| Number | Name | Date |
|---|---|---|
| 1,533,191 | Kaiser et al. | Apr. 14, 1925 |
| 1,904,884 | Royle | Apr. 18, 1933 |
| 2,359,013 | Tucker | Sept. 26, 1944 |
| 2,359,839 | Goessling | Oct. 10, 1944 |
| 2,359,840 | Goessling | Oct. 10, 1944 |